(12) United States Patent
Shi et al.

(10) Patent No.: US 10,873,438 B2
(45) Date of Patent: Dec. 22, 2020

(54) METHOD AND APPARATUS FOR FEEDING BACK DATA TRANSMISSION ACKNOWLEDGEMENT AND COMMUNICATION SYSTEM

(71) Applicant: FUJITSU LIMITED, Kawasaki (JP)

(72) Inventors: Yulong Shi, Beijing (CN); Lianhai Wu, Beijing (CN); Meiyi Jia, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/410,321

(22) Filed: May 13, 2019

(65) Prior Publication Data

US 2019/0268125 A1 Aug. 29, 2019

Related U.S. Application Data

(63) Continuation of application No. PCT/CN2016/106582, filed on Nov. 21, 2016.

(51) Int. Cl.
*H04L 5/00* (2006.01)
*H04L 1/18* (2006.01)

(52) U.S. Cl.
CPC .............. *H04L 5/0055* (2013.01); *H04L 1/18* (2013.01); *H04L 1/1812* (2013.01)

(58) Field of Classification Search
CPC ....... H04L 5/0055; H04L 1/18; H04L 1/1812; H04L 1/1614; H04L 1/1887; H04L 1/1671; H04L 1/1822
See application file for complete search history.

(56) References Cited

U.S. PATENT DOCUMENTS

2012/0134305 A1* 5/2012 Damnjanovic ....... H04L 5/0053
370/280
2012/0192026 A1* 7/2012 Chen .................... H04L 1/1819
714/751

(Continued)

FOREIGN PATENT DOCUMENTS

| CN | 101127584 A | 2/2008 |
| CN | 102136894 A | 7/2011 |
| CN | 102468940 A | 5/2012 |

OTHER PUBLICATIONS

International Search Report issued by the State Intellectual Property Office of the P.R. China for corresponding International Patent Application No. PCT/CN2016/106582, dated Mar. 30, 2017, with an English translation.

*Primary Examiner* — Walli Z Butt
(74) *Attorney, Agent, or Firm* — Myers Wolin, LLC

(57) ABSTRACT

When a user equipment is scheduled to feed back data transmission acknowledgement in a current uplink transmission channel, the user equipment orders hybrid automatic repeat request (HARQ) processes scheduled to perform data transmission acknowledgement at a current moment; the user equipment sequentially indicate whether data transmissions of the scheduled HARQ processes after ordering are successful or not via consecutive bits in feedback information bits, the number of the consecutive bits being identical to the number of the scheduled HARQ processes; and the user equipment transmits feedback information to a network side via the uplink transmission channel. Hence, a situation of data transmission of the HARQ processes scheduled to perform feeding back at the current moment is indicated in the feedback information.

16 Claims, 5 Drawing Sheets

(56) References Cited

U.S. PATENT DOCUMENTS

| | | |
|---|---|---|
| 2015/0263829 A1 | 9/2015 | Nguyen et al. |
| 2016/0128090 A1* | 5/2016 | Azarian Yazdi ...... H04L 5/0062 370/329 |
| 2019/0215810 A1* | 7/2019 | Mu ....................... H04L 1/1812 |

* cited by examiner

METHOD AND APPARATUS FOR FEEDING BACK DATA TRANSMISSION ACKNOWLEDGEMENT AND COMMUNICATION SYSTEM

CROSS REFERENCE TO RELATED APPLICATIONS

This application is a continuation application of International Application PCT/CN2016/106582 filed on Nov. 21, 2016, the entire contents of which are incorporated herein by reference.

FIELD

This disclosure relates to the field of communication technologies, and in particular to a method and apparatus for feeding back data transmission acknowledgement and a communication system.

BACKGROUND

Issues related to next-generation wireless communication systems are under study in the 3rd Generation Partnership Project (3GPP) to meet demands of new traffics, including supporting traffics having requirements for multiple types of latency. In the Hybrid Automatic Repeat Request (HARQ) mechanism of the original long term evolution (LTE) system, there exists a temporal correspondence between data transmission for the same user equipment (UE) and corresponding acknowledgement feedback. For example, for each time of data transmission, a receiver end will feed back whether this time of transmission is successfully 4 milliseconds later; wherein, "ACK" indicates successful reception, and "NACK" indicates unsuccessful reception.

The feedback (ACK/NACK) of data transmission in the HARQ is usually indicated by a physical uplink control channel (PUCCH). Currently, the LTE system supports feedback information of up to two bits.

In order to support data transmission with different latency requirements and support more flexible resource scheduling, next-generation wireless communication systems may support acknowledgement of multiple times of data transmission for the same UE in one time of feedback, that is, indicating whether multiple times of data transmission for the same UE is successful or not in one time of feedback. And each time of data transmission corresponds to one HARQ process.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in order to support acknowledgment feedback of multiple times of data transmission, a new PUCCH format needs to be designed to support feedback information of more bits, such as supporting feedback information of 4 or 8 bits. And one time of feedback may correspond to one or more times of data transmission; for example, up to 8 times of data transmission may be acknowledged of whether or not the transmissions are successful or not in this time of feedback.

Therefore, correspondences between multi-bit feedback information and multiple times of data transmission need to be determined in advance in a protocol. A most direct correspondence is that each HARQ process supported by the system corresponds to one bit in the feedback information, that is, acknowledgement of data transmission of an i-th HARQ process (process ID) is indicated by an i-th bit in the feedback information. Thus, the number of bits that a PUCCH needs to feed back should be identical to a total number of HARQ processes supported by the system. For example, in a system with total 8 HARQ processes, PUCCH information of at least 8 bits is needed to perform feedback acknowledgement.

However, a reliability of transmission of information on a PUCCH is related to the number of bits transmitted by it. Transmitting information of more bits necessarily lowers the reliability of the PUCCH. In order to ensure the reliability of the feedback information on the PUCCH, it is required to transmit information of less bits. For example, the number of bits allowed to be transmitted on a PUCCH is less than a total number of HARQ processes supported by the system. Thus, a conventional method of simply mapping PUCCH feedback information bits to all HARQ processes one-to-one may be invalid.

As regard to the above problems, embodiments of this disclosure provide a method and apparatus for feeding back data transmission acknowledgement and communication system, so as to support using relatively few feedback information bits to indicate more HARQ processes.

According to a first aspect of the embodiments of this disclosure, there is provided a method for feeding back data transmission acknowledgement, including:

when user equipment is scheduled to feed back data transmission acknowledgement in a current uplink transmission channel, ordering, by the user equipment, hybrid automatic repeat request (HARQ) processes scheduled to perform data transmission acknowledgement at a current moment;

sequentially indicating whether data transmissions of the scheduled HARQ processes after ordering are successful or not via consecutive bits in feedback information bits by the user equipment, the number of the consecutive bits being identical to the number of the scheduled HARQ processes; and transmitting feedback information by the user equipment to a network side via the uplink transmission channel.

According to a second aspect of the embodiments of this disclosure, there is provided a method for feeding back data transmission acknowledgement, including:

receiving, by network equipment, feedback information of hybrid automatic repeat request (HARQ) processes scheduled to perform data transmission acknowledgement at a current moment transmitted by user equipment;

ordering, by the network equipment, the HARQ processes scheduled to perform data transmission acknowledgement at the current moment; and determining by the network equipment whether data of the scheduled HARQ processes are successfully transmitted according to a situation of data transmission of the scheduled HARQ processes after ordering indicated by the feedback information.

According to a third aspect of the embodiments of this disclosure, there is provided an apparatus for feeding back data transmission acknowledgement, including:

an ordering unit configured to, when user equipment is scheduled to feed back data transmission acknowledgement in a current uplink transmission channel, order hybrid automatic repeat request (HARQ) processes scheduled to perform data transmission acknowledgement at a current moment;

an indicating unit configured to sequentially indicate whether data transmissions of the scheduled HARQ processes after ordering are successful or not via consecutive bits in feedback information bits, the number of the consecutive bits being identical to the number of the scheduled HARQ processes; and a transmitting unit configured to transmit feedback information to a network side via the uplink transmission channel.

According to a fourth aspect of the embodiments of this disclosure, there is provided an apparatus for feeding back data transmission acknowledgement, including:

a receiving unit configured to receive feedback information of hybrid automatic repeat request (HARQ) processes scheduled to perform data transmission acknowledgement at a current moment transmitted by user equipment;

an ordering unit configured to order the HARQ processes scheduled to perform data transmission acknowledgement at the current moment; and a first determining unit configured to determine whether data of the scheduled HARQ processes are successfully transmitted according to a situation of data transmission of the scheduled HARQ processes after ordering indicated by the feedback information.

According to a fifth aspect of the embodiments of this disclosure, there is provided a user equipment, configured with the apparatus as described in the third aspect.

According to a sixth aspect of the embodiments of this disclosure, there is provided a network equipment, configured with the apparatus as described in the fourth aspect.

According to a seventh aspect of the embodiments of this disclosure, there is provided a communication system, including a network equipment and a user equipment, the network equipment being configured with the apparatus as described in the fourth aspect, and the user equipment being configured with the apparatus as described in the third aspect.

An advantage of the embodiments of this disclosure exists in that with the embodiments of this disclosure, only a situation of data transmissions of the HARQ processes scheduled to perform feeding back at the current moment is indicated in the feedback information. Thus, using relatively few feedback information bits to feed back data transmission acknowledgement may be supported in a system with more HARQ processes, thereby improving a reliability of transmission of a feedback channel.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In this disclosure, a base station refers to an equipment at a network side, which may be referred to as a transmission point, an access point, a broadcast transmitter, a node B, or an evolution node B (eNB), and an RRH, etc., and may include some or all functions thereof. A term "network equipment" shall be used in the text, and each network equipment provides communication coverage for a specific geographical region.

In this disclosure, a terminal or an equipment may be referred to as "a user equipment (UE)". The UE may be fixed or mobile, and may also be referred to as a mobile station, an access terminal, a user unit, or a station, etc. The UE may be a cellular phone, a personal digital assistant (PDA), a wireless modem, a wireless communication device, a handhold device, a lap-top computer, a cordless telephone, and a vehicle, etc.

An embodiment of this disclosure provides a method for feeding back data transmission acknowledgement, in which only a situation of data transmissions of the HARQ processes scheduled to perform data transmission acknowledgement at the current moment (referred to as this time of feedback) is indicated in the feedback information. For the sake of convenience of explanation, the embodiments of this disclosure shall be described by taking "transmitting data by a network side to a user equipment side, and feeding back data transmission acknowledgement by the user equipment side to the network side" as an example only. However, the embodiments of this disclosure are not limited thereto, and principles and schemes of the embodiments of this disclosure are also applicable to a scenario where "transmitting data by a user equipment side to a network side, and feeding back data transmission acknowledgement by the network side to the user equipment side".

The embodiments of this disclosure shall be described below with reference to the accompanying drawings.

Embodiment 1

Figure 1:
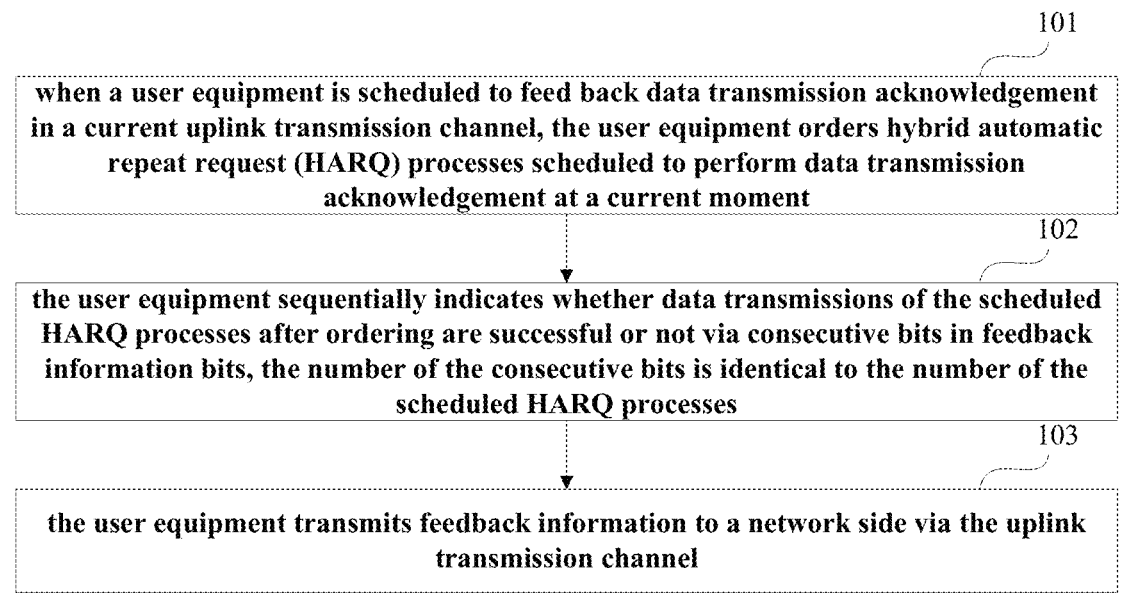
FIG. 1 is a schematic diagram of the method for feeding back data transmission acknowledgement of Embodiment 1.

This embodiment provides a method for feeding back data transmission acknowledgement, applicable to a user equipment side. FIG. 1 is a schematic diagram of the method. As shown in FIG. 1, the method includes:

step 101: when a user equipment is scheduled to feed back data transmission acknowledgement in a current uplink transmission channel, the user equipment orders hybrid automatic repeat request (HARQ) processes scheduled to perform data transmission acknowledgement at a current moment;

step 102: the user equipment sequentially indicates whether data transmissions of the scheduled HARQ processes after ordering are successful or not via consecutive bits in feedback information bits, the number of the consecutive bits is identical to the number of the scheduled HARQ processes; and step 103: the user equipment transmits feedback information to a network side via the uplink transmission channel.

In this embodiment, as described above, not all data transmissions of the HARQ processes are acknowledged in this time of feedback, and how many HARQ processes are scheduled each time of which data transmission is acknowledged in the same time of feedback is determined by the network side. The network side usually schedules a smaller number of HARQ processes to perform acknowledge in the same time of feedback, for example, the number is less than or equal to the number of bits used for feeding back data transmission acknowledgement supported by the uplink transmission channel.

In this embodiment, it is assumed that the current system supports M HARQ processes, in which data transmissions of N HARQ processes are scheduled to be acknowledged in this time of feedback, and an uplink transmission channel used for this time of feedback supports L bits, that is, the uplink transmission channel supports feedback information of L bits, the L bits being referred to as feedback information bits, wherein, N⩽L, N⩽M, and L⩽M, and particular values of L, M and N are commonly known to the network equipment (such as an eNB) and the user equipment (UE).

In this embodiment, when the UE is scheduled to perform feedback of the data transmission acknowledgement in the current uplink transmission channel, it may order the N HARQ processes scheduled to perform data transmission acknowledgement at the current time, and sequentially indicate whether data of the N HARQ processes are successfully transmitted via consecutive N bits in the L bits. Thus, as a situation of data transmission of the HARQ processes needing to be acknowledged in this time of feedback is only indicated in the feedback information, a situation of data transmissions of more HARQ processes may be indicated via relatively few feedback information bits, thereby improving a reliability of transmission of a feedback channel.

In this embodiment, the above consecutive bits may be first N consecutive bits in the above feedback information bits, or may be last N consecutive bits in the above feedback information bits, or may be N consecutive bits at any positions in the above feedback information bits, as described above, N being the number of the HARQ processes scheduled for data transmission acknowledgement at the current time.

In this embodiment, the N HARQ processes after ordering may be named as an i-th HARQ process, $i=1, 2, 3, \ldots, N$, and an i-th bit in the above consecutive bits may be used to indicate whether data transmission of the i-th HARQ process in the scheduled HARQ processes after ordering is successful or not. For example, "1" indicates that the data of the HARQ process are successfully received, and "0" indicates that the data transmission of the HARQ process is unsuccessful. However, this indication mode is illustrative only, and this embodiment is not limited thereto.

In this embodiment, if N<L, that is, the number (L) of feedback information bits supported by the system for performing data transmission acknowledgement is greater than the number (N) of the HARQ processes scheduled for data transmission acknowledgement at the current time, $N+1, N+2, N+3, \ldots, L$ bits in the L feedback information bits are not used to indicate the data transmission acknowledgement of the HARQ process, which are meaningless, and may be set to be 1 or 0.

In one implementation of this embodiment, the user equipment may ascendingly or descendingly order the scheduled HARQ processes according to process numbers of the scheduled HARQ processes.

For example, M=8, N=3, L=4, and the process numbers of the 8 HARQ processes are $0, 1, 2, 3 \ldots, 7$, respectively; wherein, HARQ process 3, HARQ process 4 and HARQ process 6 are scheduled for acknowledgement feedback at the current time. According to this implementation, if the ordering is performed in an ascending order of the process numbers, a first bit in three consecutive bits in the four feedback information bits indicates a transmission situation of HARQ process 3, a second bit indicates a transmission situation of HARQ process 4, a third bit indicates a transmission situation of HARQ process 6, and a fourth bit is meaningless.

In another implementation of this embodiment, the user equipment may ascendingly or descendingly order the scheduled HARQ processes according to data transmission timing of the scheduled HARQ processes.

For example, M=8, N=3, L=4, and the process numbers of the 8 HARQ processes are $0, 1, 2, 3 \ldots, 7$, respectively; wherein, HARQ process 3 performs data transmission in a first subframe, HARQ process 4 performs data transmission in a 5th subframe, and HARQ process 6 performs data transmission in a 3rd subframe, and they are all scheduled to perform acknowledgement feedback at the current time. According to this implementation, if the ordering is performed in an ascending order of the data transmission timing, a first bit in three consecutive bits in the four feedback information bits indicates a transmission situation of HARQ process 3, a second bit indicates a transmission situation of HARQ process 6, a third bit indicates a transmission situation of HARQ process 4, and a fourth bit is meaningless.

In a further implementation of this embodiment, the user equipment may ascendingly or descendingly order the scheduled HARQ processes according to physical layer numerology used by data of the scheduled HARQ processes.

For example, M=8, N=3, L=4, and the process numbers of the 8 HARQ processes are 0, 1, 2, 3 . . . , 7, respectively; wherein, a numerology ID used by HARQ process 3 is 4, a numerology ID used by HARQ process 4 is 0, a numerology ID used by HARQ process 6 is 2, and they are all scheduled to perform acknowledgement feedback at the current time. According to this implementation, if the ordering is performed in an ascending order of the numerology IDs used by the data, a first bit in three consecutive bits in the four feedback information bits indicates a transmission situation of HARQ process 4, a second bit indicates a transmission situation of HARQ process 6, a third bit indicates a transmission situation of HARQ process 3, and a fourth bit is meaningless.

In this implementation, if the physical layer numerology used by the data of any more than two of the scheduled HARQ processes are identical, the user equipment may ascendingly or descendingly order the more than two of the scheduled HARQ processes according to process numbers or data transmission timing of the more than two of the scheduled HARQ processes, an ordering method being identical to those in the above two implementations, which shall not be described herein any further.

In this embodiment, after the user equipment sequentially indicates whether the data transmission of the scheduled HARQ processes after ordering are successful or not via the consecutive bits in the feedback information bits, the user equipment may transmit the feedback information to the network side via the above uplink transmission channel.

In this embodiment, the uplink transmission channel is, for example, a PUCCH. However, this embodiment is not limited thereto, and the uplink transmission channel may also be other channels used for feeding back data transmission acknowledgement, such as a physical uplink shared channel (PUSCH).

In this embodiment, as described above, if N<L, the unused feedback information bits are meaningless, and may be set to be 1 or 0.

With the method of this embodiment, only a situation of data transmission of the HARQ processes scheduled to perform feeding back at the current moment is indicated in the feedback information. Thus, using relatively few feedback information bits to feed back data transmission acknowledgement may be supported in a system with more HARQ processes, thereby improving a reliability of transmission of a feedback channel.

Embodiment 2

This embodiment provides a method for feeding back data transmission acknowledgement, applicable to a network side. This method is processing at a network side corresponding to the method of Embodiment 1, with contents identical to those in Embodiment 1 being not going to be described herein any further.

Figure 2:
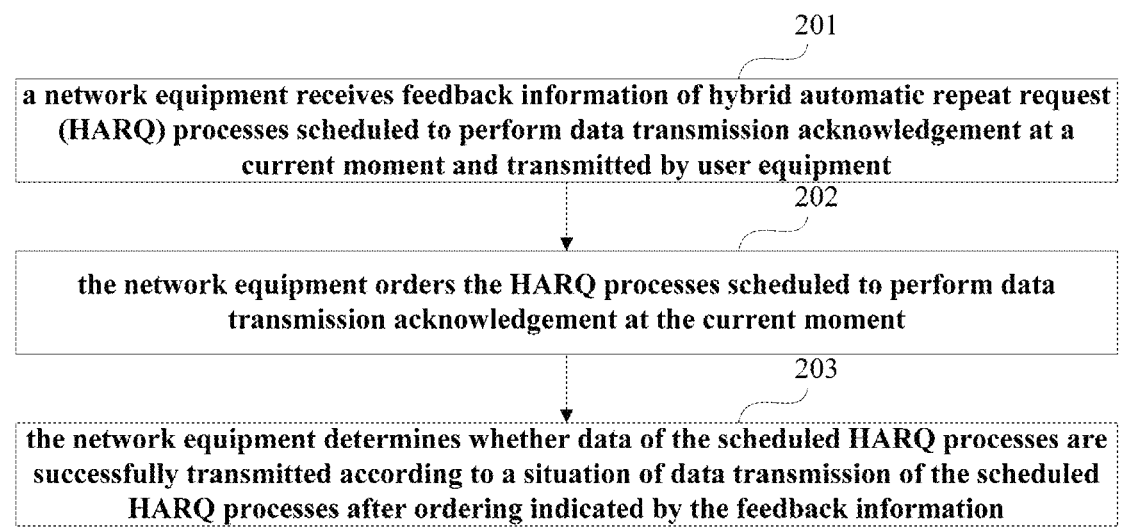
FIG. 2 is a schematic diagram of the method for feeding back data transmission acknowledgement of Embodiment 2.

FIG. 2 is a schematic diagram of the method. As shown in FIG. 2, the method includes:

step 201: a network equipment receives feedback information of hybrid automatic repeat request (HARQ) processes scheduled to perform data transmission acknowledgement at a current moment and transmitted by user equipment;

step 202: the network equipment orders the HARQ processes scheduled to perform data transmission acknowledgement at the current moment (briefly referred to as scheduled HARQ processes); and step 203: the network equipment determines whether data of the scheduled HARQ processes are successfully transmitted according to a situation of data transmission of the scheduled HARQ processes after ordering indicated by the feedback information.

In this embodiment, the feedback information sequentially indicates a data transmission situation of the scheduled HARQ processes via consecutive bits in the feedback information bits; wherein, the number of the consecutive bits is identical to the number of the scheduled HARQ processes. Thus, as a situation of data transmission of the HARQ processes needing to be acknowledged in this time of feedback is only indicated in the feedback information, a situation of data transmissions of more HARQ processes may be indicated via relatively few feedback information bits, thereby improving a reliability of transmission of a feedback channel.

In this embodiment, "the current system supports M HARQ processes, in which N HARQ processes are scheduled to be acknowledged in this time of feedback, and the system supports feedback information of L bits to be used for feedback of the above data transmission acknowledgement" is still taken as an example. After receiving the feedback information of L bits fed back by the UE, the network side orders the N scheduled HARQ processes, and judges according to an i-th bit in the feedback information whether data of an i-th HARQ process after ordering are successful transmitted. A meaning of i here is the same as that in Embodiment 1, which shall not be described any further. Thus, a situation of data transmission of more HARQ processes is indicated via relatively few bits, thereby improving a reliability of transmission of a feedback channel.

In this embodiment, the above feedback information is transmitted via an uplink transmission channel (such as the PUCCH or the PUSCH described in Embodiment 1), and a transmission mode is not limited in this embodiment.

In this embodiment, similar to the method for ordering the scheduled HARQ processes by the user equipment in Embodiment 1, the network equipment may ascendingly or descendingly order the scheduled HARQ processes according to process numbers of the scheduled HARQ processes, or may ascendingly or descendingly order the scheduled HARQ processes according to data transmission timing of the scheduled HARQ processes, or may ascendingly or descendingly order the scheduled HARQ processes according to physical layer numerology used by data of the scheduled HARQ processes. And if the physical layer numerology used by the data of any more than two of the scheduled HARQ processes are identical, the network equipment may further ascendingly or descendingly order the more than two of the scheduled HARQ processes according to process numbers or data transmission timing of the more than two of the scheduled HARQ processes.

In this embodiment, the network equipment may further determine a correspondence between the scheduled HARQ processes after ordering and the process numbers of the scheduled HARQ processes according to a method for ordering the scheduled HARQ processes. Therefore, whether the data of the scheduled HARQ process are successfully transmitted may be determined according to the data transmission situation of the scheduled HARQ process indicated by the above feedback information.

With the method of this embodiment, only a situation of data transmission of the HARQ processes scheduled to perform feeding back at the current moment is indicated in the feedback information. Thus, using relatively few feedback information bits to feed back data transmission acknowledgement may be supported in a system with more HARQ processes, thereby improving a reliability of transmission of a feedback channel.

Embodiment 3

This embodiment provides an apparatus for feeding back data transmission acknowledgement. As principles of the apparatus for solving problems are similar to that of the method in Embodiment 1, the implementation of the method in Embodiment 1 may be referred to for implementation of the apparatus, with identical contents being not going to be described herein any further.

Figure 3:
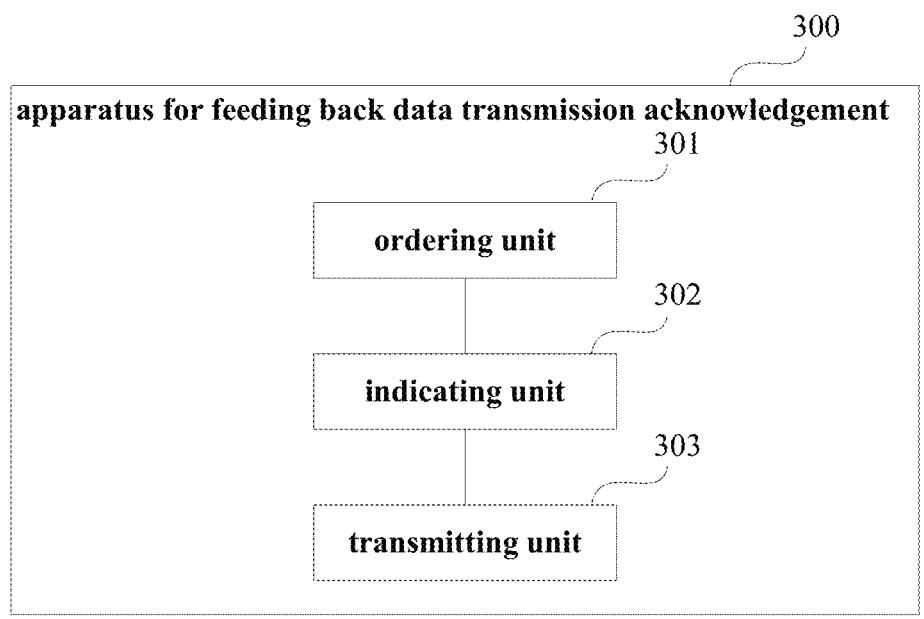
FIG. 3 is a schematic diagram of the apparatus for feeding back data transmission acknowledgement of Embodiment 3.

FIG. 3 is a schematic diagram of the apparatus for feeding back data transmission acknowledgement of this embodiment. As shown in FIG. 3, an apparatus for feeding back data transmission acknowledgement 300 includes: an ordering unit 301, an indicating unit 302 and a transmitting unit 303. When user equipment is scheduled to feed back data transmission acknowledgement in a current uplink transmission channel, the ordering unit 301 orders hybrid automatic repeat request (HARQ) processes scheduled to perform data transmission acknowledgement at a current moment; the indicating unit 302 sequentially indicates whether data transmission of the scheduled HARQ processes after ordering is successful or not via consecutive bits in feedback information bits, the number of the consecutive bits being identical to the number of the scheduled HARQ processes; and the transmitting unit 303 transmits feedback information to a network side via the uplink transmission channel.

In one implementation of this embodiment, the ordering unit 301 ascendingly or descendingly orders the scheduled HARQ processes according to process numbers of the scheduled HARQ processes.

In another implementation of this embodiment, the ordering unit 301 ascendingly or descendingly orders the scheduled HARQ processes according to data transmission timing of the scheduled HARQ processes.

In a further implementation of this embodiment, the ordering unit 301 ascendingly or descendingly orders the scheduled HARQ processes according to physical layer numerology used by data of the scheduled HARQ processes. In this implementation, if the physical layer numerology used by the data of any more than two of the scheduled HARQ processes are identical, the ordering unit 301 ascendingly or descendingly orders the more than two of the scheduled HARQ processes according to process numbers or data transmission timing of the more than two of the scheduled HARQ processes.

In this embodiment, the consecutive bits are first N consecutive bits, or last N consecutive bits, or N consecutive bits at any positions, in the feedback information bits, N being the number of the scheduled HARQ processes.

In this embodiment, an i-th bit in the consecutive bits is used to indicate whether data transmission of an i-th HARQ process in the scheduled HARQ processes after order is successful or not, i=1, 2, 3, N, and N being the number of the scheduled HARQ processes.

In this embodiment, the uplink transmission channel is a physical uplink control channel (PUCCH).

With the apparatus of this embodiment, only a situation of data transmission of the HARQ processes scheduled to perform feeding back at the current moment is indicated in the feedback information. Thus, using relatively few feedback information bits to feed back data transmission acknowledgement may be supported in a system with more HARQ processes, thereby improving a reliability of transmission of a feedback channel.

This embodiment further provides a user equipment, configured with the apparatus 300 for feeding back data transmission acknowledgement described above.

Figure 4:
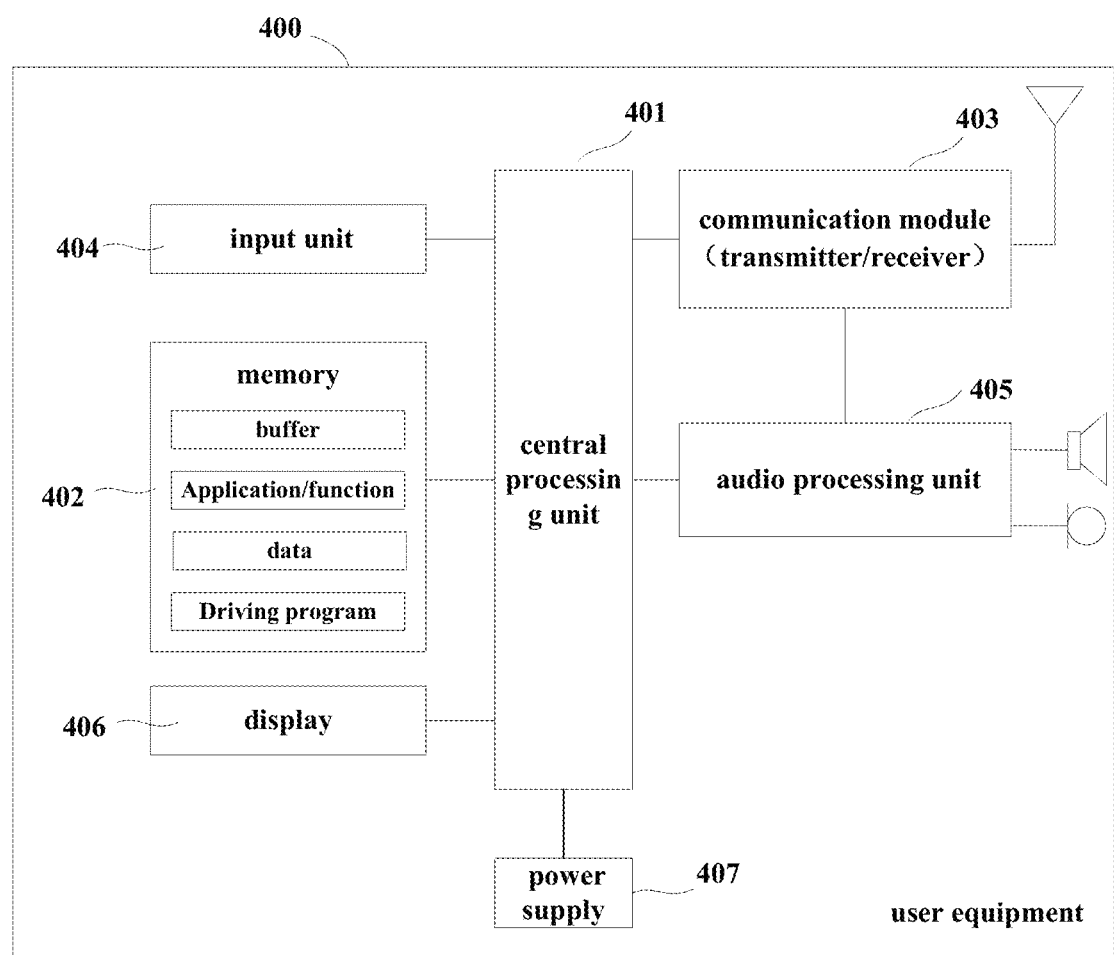
FIG. 4 is a schematic diagram of the user equipment of Embodiment 3.

FIG. 4 is a block diagram of a systematic structure of a user equipment 400 of the embodiment of this disclosure. As shown in FIG. 4, a user equipment 400 may include a central processing unit 401 and a memory 402, the memory 402 being coupled to the central processing unit 401. It should be noted that this figure is illustrative only, and other types of structures may also be used, so as to supplement or replace this structure and achieve a telecommunications function or other functions.

In one implementation, the functions of the apparatus 300 for feeding back data transmission acknowledgement may be integrated into the central processing unit 401. The central processing unit 401 may be configured to carry out the method for feeding back data transmission acknowledgement as described in Embodiment 1.

For example, the central processing unit 401 may be configured to perform the following control: when the user equipment is scheduled to feed back data transmission acknowledgement in a current uplink transmission channel, ordering hybrid automatic repeat request (HARQ) processes scheduled to perform data transmission acknowledgement at a current moment; sequentially indicating whether data transmissions of the scheduled HARQ processes after ordering are successful or not via consecutive bits in feedback information bits, the number of the consecutive bits being identical to the number of the scheduled HARQ processes; and transmitting feedback information to a network side via the uplink transmission channel.

In another implementation, the apparatus 300 for feeding back data transmission acknowledgement and the central processing unit 401 may be configured separately. For example, the apparatus 300 for feeding back data transmission acknowledgement may be configured as a chip connected to the central processing unit 401, with its functions being realized under control of the central processing unit 401.

As shown in FIG. 4, the user equipment 400 may further include a communication module 403, an input unit 404, an audio processing unit 405, a display 406 and a power supply 407. It should be noted that the user equipment 400 does not necessarily include all the parts shown in FIG. 4; and furthermore, the user equipment 400 may include parts not shown in FIG. 4, and the related art may be referred to.

As shown in FIG. 4, the central processing unit 401 is sometimes referred to as a controller or control, which may include a microprocessor or other processor devices and/or logic devices, and the central processing unit 401 receives input and controls operations of every component of the user equipment 400.

The memory 402 may be, for example, one or more of a buffer memory, a flash memory, a hard drive, a mobile medium, a volatile memory, a nonvolatile memory, or other suitable devices, which may store the information on the HARQ processes, and feedback information, etc., and furthermore, store programs executing related information. And the central processing unit 401 may execute programs stored in the memory 402, so as to realize information storage or processing, etc. Functions of other parts are similar to those of the related art, which shall not be described herein any further. The parts of the user equipment 400 may be realized by specific hardware, firmware, software, or any combination thereof, without departing from the scope of the present disclosure.

With the user equipment of this embodiment, only a situation of data transmission of the HARQ processes scheduled to perform feeding back at the current moment is indicated in the feedback information. Thus, using relatively few feedback information bits to feed back data transmission acknowledgement may be supported in a system with more HARQ processes, thereby improving a reliability of transmission of a feedback channel.

Embodiment 4

This embodiment provides an apparatus for feeding back data transmission acknowledgement. As principles of the apparatus for solving problems are similar to that of the method in Embodiment 2, the implementation of the method in Embodiment 2 may be referred to for implementation of the apparatus, with identical contents being not going to be described herein any further.

Figure 5:
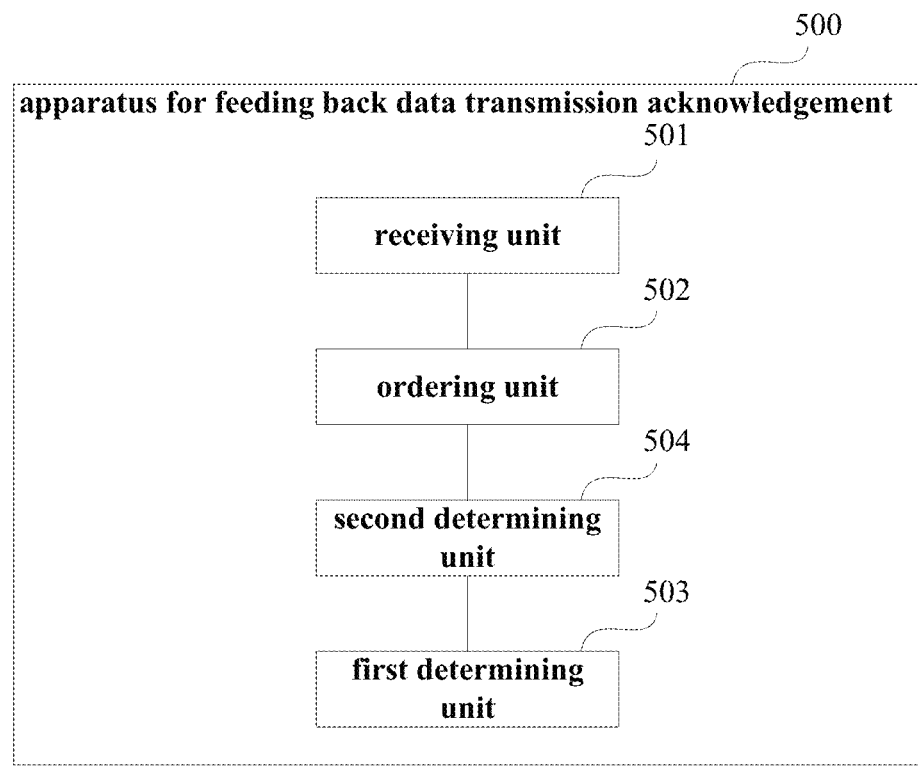
FIG. 5 is a schematic diagram of the apparatus for feeding back data transmission acknowledgement of Embodiment 4.

FIG. 5 is a schematic diagram of the apparatus for feeding back data transmission acknowledgement of this embodiment. As shown in FIG. 5, an apparatus for feeding back data transmission acknowledgement 500 includes: a receiving unit 501, an ordering unit 502 and a first determining unit 503. The receiving unit 501 receives feedback information of hybrid automatic repeat request (HARQ) processes scheduled to perform data transmission acknowledgement at a current moment transmitted by user equipment; the ordering unit 502 orders the HARQ processes scheduled to perform data transmission acknowledgement at the current moment; and the first determining unit 503 determines whether data of the scheduled HARQ processes are successfully transmitted according to a situation of data transmission of the scheduled HARQ processes after ordering indicated by the feedback information.

In this embodiment, the feedback information sequentially indicates the situation of data transmission of the scheduled HARQ processes via consecutive bits in feedback information bits; wherein, the number of the consecutive bits is identical to the number of the scheduled HARQ processes.

In one implementation of this embodiment, the ordering unit 502 ascendingly or descendingly orders the scheduled HARQ processes according to process numbers of the scheduled HARQ processes.

In another implementation of this embodiment, the ordering unit 502 ascendingly or descendingly orders the scheduled HARQ processes according to data transmission timing of the scheduled HARQ processes.

In a further implementation of this embodiment, the ordering unit 502 ascendingly or descendingly orders the scheduled HARQ processes according to physical layer numerology used by data of the scheduled HARQ processes.

In this implementation, if the physical layer numerology used by the data of any more than two of the scheduled HARQ processes are identical, the ordering unit ascendingly or descendingly orders the more than two of the scheduled HARQ processes according to process numbers or data transmission timing of the more than two of the scheduled HARQ processes.

In this embodiment, as shown in FIG. 5, the apparatus may further include:

a second determining unit 504 configured to determine a correspondence between the scheduled HARQ processes after ordering and the process numbers of the scheduled HARQ processes according to a method for ordering the scheduled HARQ processes.

With the apparatus of this embodiment, only a situation of data transmission of the HARQ processes scheduled to perform feeding back at the current moment is indicated in the feedback information. Thus, using relatively few feedback information bits to feed back data transmission acknowledgement may be supported in a system with more HARQ processes, thereby improving a reliability of transmission of a feedback channel.

This embodiment further provides a network equipment, configured with the apparatus 500 for feeding back data transmission acknowledgement described above.

Figure 6:
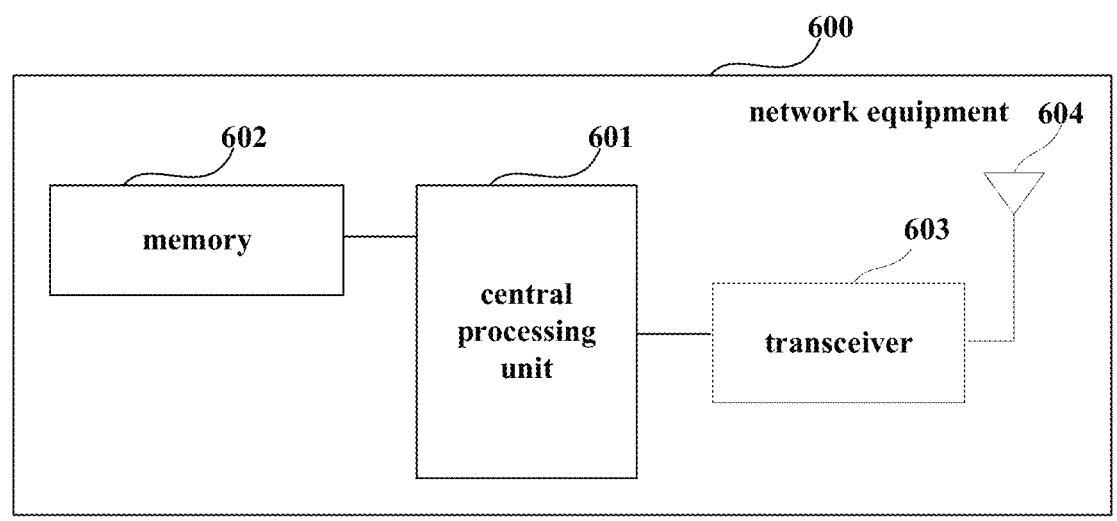
FIG. 6 is a schematic diagram of the network equipment of Embodiment 4.

FIG. 6 is a block diagram of a systematic structure of the network equipment of the embodiment of this disclosure. As shown in FIG. 6, a network equipment 600 may include a central processing unit (CPU) 601 and a memory 602, the memory 602 being coupled to the central processing unit 601. The memory 602 may store various data, and furthermore, it may store a program for data processing, and execute the program under control of the central processing unit 601, so as to receive various information transmitted by the user equipment, and transmit various information to the user equipment.

In one implementation, the functions of the apparatus 500 for feeding back data transmission acknowledgement may be integrated into the central processing unit 601. The central processing unit 601 may be configured to carry out the method for feeding back data transmission acknowledgement as described in Embodiment 2.

For example, the central processing unit 601 may be configured to perform the following control: receiving feedback information of hybrid automatic repeat request (HARQ) processes scheduled to perform data transmission acknowledgement at a current moment transmitted by user equipment; ordering the HARQ processes scheduled to perform data transmission acknowledgement at the current moment; and determining whether data of the scheduled HARQ processes are successfully transmitted according to a situation of data transmission of the scheduled HARQ processes after ordering indicated by the feedback information.

In another implementation, the apparatus 500 for feeding back data transmission acknowledgement and the central processing unit 601 may be configured separately. For example, the apparatus 500 for feeding back data transmission acknowledgement may be configured as a chip connected to the central processing unit 601, with its functions being realized under control of the central processing unit 601.

Furthermore, as shown in FIG. 6, the network equipment 600 may include a transceiver 603, and an antenna 604, etc. Functions of the above components are similar to those in the related art, and shall not be described herein any further. It should be noted that the network equipment 600 does not necessarily include all the parts shown in FIG. 6, and furthermore, the network equipment 600 may include parts not shown in FIG. 6, and the related art may be referred to.

With the network equipment of this embodiment, only a situation of data transmission of the HARQ processes scheduled to perform feeding back at the current moment is indicated in the feedback information. Thus, using relatively few feedback information bits to feed back data transmission acknowledgement may be supported in a system with more HARQ processes, thereby improving a reliability of transmission of a feedback channel.

Embodiment 5

This embodiment provides a communication system, including a network equipment and a user equipment.

Figure 7:
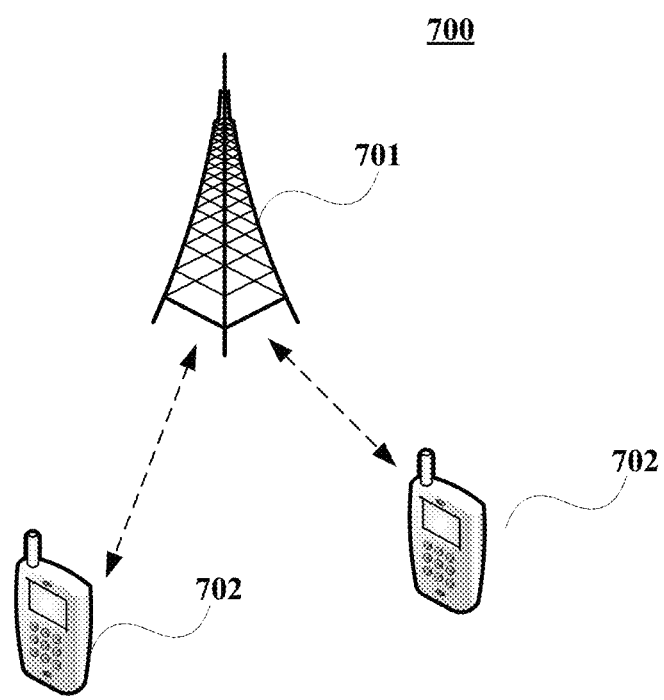
FIG. 7 is a schematic diagram of the communication system of Embodiment 5.

FIG. 7 is a schematic diagram of a structure of the communication system of the embodiment of this disclosure. As shown in FIG. 7, a communication system 700 includes a network equipment 701 and a user equipment 702; wherein, the network equipment 701 may be the network equipment 600 described in Embodiment 3, and the user equipment 702 may be the user equipment 400 described in Embodiment 4.

As the user equipment 400 and the network equipment 600 have been described in detail in the previous embodiments, the contents of them are incorporated herein, which shall not be described herein any further.

With the communication system of this embodiment, only a situation of data transmission of the HARQ processes scheduled to perform feeding back at the current moment is indicated in the feedback information. Thus, using relatively few feedback information bits to feed back data transmission acknowledgement may be supported in a system with more HARQ processes, thereby improving a reliability of transmission of a feedback channel.

An embodiment of the present disclosure provides a computer readable program, which, when executed in an apparatus for feeding back data transmission acknowledgement or user equipment, may cause the apparatus for feeding back data transmission acknowledgement or the user equipment to carry out the method for feeding back data transmission acknowledgement as described in Embodiment 1.

An embodiment of the present disclosure provides a computer storage medium, including a computer readable program, which may cause an apparatus for feeding back data transmission acknowledgement or user equipment to carry out the method for feeding back data transmission acknowledgement as described in Embodiment 1.

An embodiment of the present disclosure provides a computer readable program, which, when executed in an apparatus for feeding back data transmission acknowledgement or network equipment, may cause the apparatus for feeding back data transmission acknowledgement or the network equipment to carry out the method for feeding back data transmission acknowledgement as described in Embodiment 2.

An embodiment of the present disclosure provides a computer storage medium, including a computer readable program, which will cause an apparatus for feeding back data transmission acknowledgement or network equipment to carry out the method for feeding back data transmission acknowledgement as described in Embodiment 2.

The above apparatuses and method of this disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The methods for feeding back data transmission acknowledgement carried out in the apparatuses for feeding back data transmission acknowledgement described with reference to the embodiments of this disclosure may be directly embodied as hardware, software modules executed by a processor, or a combination thereof. For example, one or more functional block diagrams and/or one or more combinations of the functional block diagrams shown in FIG. 3 or 5 may either correspond to software modules of procedures of a computer program, or correspond to hardware modules. Such software modules may respectively correspond to the steps shown in FIG. 1 or 2. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 3 or 5 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 3 or 5 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. An apparatus for feeding back data transmission acknowledgement, comprising:
   a memory that stores a plurality of instructions; and
   processor circuitry that couples to the memory and is configured to execute the instructions to:
   order more than one hybrid automatic repeat request (HARQ) processes scheduled to perform data transmission acknowledgement at a current moment, when a user equipment is scheduled to feed back data transmission acknowledgement in a current uplink transmission channel;

sequentially indicate whether data transmissions of the scheduled HARQ processes after ordering are successful or not via consecutive bits in feedback information bits, the number of the consecutive bits being identical to the number of the scheduled HARQ processes; and transmit feedback information to a network side via the uplink transmission channel.

2. The apparatus according to claim 1, wherein the processor circuitry is further configured to ascendingly or descendingly order the scheduled HARQ processes according to process numbers of the scheduled HARQ processes.

3. The apparatus according to claim 1, wherein the processor circuitry is further configured to ascendingly or descendingly order the scheduled HARQ processes according to data transmission timing of the scheduled HARQ processes.

4. The apparatus according to claim 1, wherein the processor circuitry is further configured to ascendingly or descendingly order the scheduled HARQ processes according to physical layer numerology used by data of the scheduled HARQ processes.

5. The apparatus according to claim 4, wherein if the physical layer numerology used by the data of two scheduled HARQ processes is identical, the processor circuitry is further configured to ascendingly or descendingly order the two scheduled HARQ processes according to process numbers or data transmission timing of the two scheduled HARQ processes.

6. The apparatus according to claim 1, wherein the consecutive bits are first N consecutive bits, or last N consecutive bits, or N consecutive bits at any positions, in the feedback information bits, N being the number of the scheduled HARQ processes.

7. The apparatus according to claim 1, wherein an i-th bit in the consecutive bits is used to indicate whether data transmission of an i-th HARQ process in the scheduled HARQ processes after ordering is successful or not, i=1, 2, 3, N, and N being the number of the scheduled HARQ processes.

8. The apparatus according to claim 1, wherein the uplink transmission channel is a physical uplink control channel (PUCCH).

9. An apparatus for feeding back data transmission acknowledgement, comprising:
a memory that stores a plurality of instructions; and
processor circuitry that couples to the memory and is configured to execute the instructions to:
receive feedback information of hybrid automatic repeat request (HARQ) processes scheduled to perform data transmission acknowledgement at a current moment and transmitted by a user equipment;
order the HARQ processes scheduled to perform data transmission acknowledgement at the current moment; and
determine whether data of the scheduled HARQ processes are successfully transmitted according to a situation of data transmission of the scheduled HARQ processes after ordering indicated by the feedback information.

10. The apparatus according to claim 9, wherein the feedback information sequentially indicates the situation of data transmission of the scheduled HARQ processes via consecutive bits in feedback information bits; and wherein, the number of the consecutive bits is identical to the number of the scheduled HARQ processes.

11. The apparatus according to claim 9, wherein the processor circuitry is further configured to ascendingly or descendingly order the scheduled HARQ processes according to process numbers of the scheduled HARQ processes.

12. The apparatus according to claim 9, wherein the processor circuitry is further configured to ascendingly or descendingly order the scheduled HARQ processes according to data transmission timing of the scheduled HARQ processes.

13. The apparatus according to claim 9, wherein the processor circuitry is further configured to ascendingly or descendingly order the scheduled HARQ processes according to physical layer numerology used by data of the scheduled HARQ processes.

14. The apparatus according to claim 13, wherein if the physical layer numerology used by the data of any more than two of the scheduled HARQ processes are identical, the processor circuitry is further configured to ascendingly or descendingly order the more than two of the scheduled HARQ processes according to process numbers or data transmission timing of the more than two of the scheduled HARQ processes.

15. The apparatus according to claim 9, wherein the processor circuitry is further configured to:
determine a correspondence between the scheduled HARQ processes after ordering and the process numbers of the scheduled HARQ processes according to a method for ordering the scheduled HARQ processes.

16. A communication system, comprising:
a first apparatus comprising:
a receiver configured to receive feedback information of hybrid automatic repeat request (HARQ) processes scheduled to perform data transmission acknowledgement at a current moment and transmitted by a user equipment; and
processor circuitry configured to
order the HARQ processes scheduled to perform data transmission acknowledgement at the current moment, and
determine whether data of the scheduled HARQ processes are successfully transmitted according to a situation of data transmission of the scheduled HARQ processes after ordering indicated by the feedback information; and
a second apparatus comprising:
processor circuitry configured to,
when a user equipment is scheduled to feed back data transmission acknowledgement in a current uplink transmission channel, order more than one hybrid automatic repeat request (HARQ) processes scheduled to perform data transmission acknowledgement at a current moment; and
sequentially indicate whether data transmissions of the scheduled HARQ processes after ordering are successful or not via consecutive bits in feedback information bits, the number of the consecutive bits being identical to the number of the scheduled HARQ processes; and
a transmitter configured to transmit feedback information to a network side via the uplink transmission channel.

* * * * *